(12) United States Patent
Hemmings et al.

(10) Patent No.: US 10,215,547 B2
(45) Date of Patent: Feb. 26, 2019

(54) METHOD FOR OPERATING A COORDINATE MEASURING MACHINE

(71) Applicant: Mitutoyo Corporation, Kanagawa-ken (JP)

(72) Inventors: Scott Ellis Hemmings, Edmonds, WA (US); Andrew Patzwald, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 166 days.

(21) Appl. No.: 15/476,551

(22) Filed: Mar. 31, 2017

(65) Prior Publication Data

US 2017/0370689 A1 Dec. 28, 2017

Related U.S. Application Data

(63) Continuation-in-part of application No. 15/192,799, filed on Jun. 24, 2016, now Pat. No. 9,970,744.

(51) Int. Cl.
*G01B 5/008* (2006.01)
*G01B 21/04* (2006.01)

(52) U.S. Cl.
CPC .......... *G01B 5/008* (2013.01); *G01B 21/045* (2013.01)

(58) Field of Classification Search
CPC .............................. G01B 5/008; G01B 21/045
(Continued)

(56) References Cited

U.S. PATENT DOCUMENTS

| 4,780,961 A | 11/1988 | Shelton et al. |
| 6,131,301 A | 10/2000 | Sutherland |

(Continued)

FOREIGN PATENT DOCUMENTS

| EP | 0 420 416 A2 | 4/1991 |
| EP | 0 506 318 B1 | 8/1995 |
| EP | 2 230 481 A2 | 9/2010 |

OTHER PUBLICATIONS

Extended European Search Report, dated Sep. 14, 2017, for European Application No. 17176098.6-1568, 11 pages.

(Continued)

*Primary Examiner* — Christopher W Fulton
(74) *Attorney, Agent, or Firm* — Seed IP Law Group LLP

(57) ABSTRACT

A method is disclosed for operating a coordinate measuring machine (CMM) including a workpiece scanning probe. The method provides two different measurement sampling period durations in the scanning probe: a first shorter sampling duration provides a faster measurement having a first accuracy, a second longer sampling duration provides a slower measurement having a second (better) accuracy. The shorter sampling duration may be repeatedly interleaved or alternated with the longer sampling duration to provide sufficient accuracy and response time for motion control purposes during ongoing operation of the CMM. The longer sampling duration may provide high accuracy probe measurements to combine with position coordinate values from encoders located on motion axes of the CMM (outside the scanning probe) to provide high accuracy workpiece measurements at a desired frequency, or upon demand. A probe measurement timing subsystem may determine initiation times of the first and second sampling durations.

19 Claims, 10 Drawing Sheets

(58) Field of Classification Search
USPC .......................................... 33/503, 558, 561
See application file for complete search history.

(56) References Cited

U.S. PATENT DOCUMENTS

| | | | |
|---|---|---|---|
| 6,487,785 B1 | 12/2002 | Ritz | |
| 6,971,183 B2 | 12/2005 | Brenner et al. | |
| 7,478,256 B2 | 1/2009 | Conway et al. | |
| 7,652,275 B2 | 1/2010 | Gladnick | |
| 7,821,420 B2 | 10/2010 | Woollen et al. | |
| 8,392,740 B2 | 3/2013 | Dewhirst et al. | |
| 8,438,746 B2 | 5/2013 | Usui | |
| 9,077,513 B2 | 7/2015 | Fritsch | |
| 9,803,972 B2 | 10/2017 | Sesko | |
| 9,970,744 B2 * | 5/2018 | Hemmings | G01B 5/008 |
| 2004/0200086 A1 * | 10/2004 | Fuge | G01B 7/002 |
| | | | 33/558 |
| 2005/0263727 A1 | 12/2005 | Noda | |
| 2007/0245584 A1 * | 10/2007 | Hagl | G01B 21/045 |
| | | | 33/561 |
| 2008/0051927 A1 | 2/2008 | Prestidge et al. | |
| 2010/0018069 A1 | 1/2010 | Ould et al. | |
| 2010/0050837 A1 * | 3/2010 | Ould | G01B 21/042 |
| | | | 83/14 |
| 2014/0059872 A1 * | 3/2014 | Nakagawa | G01B 21/045 |
| | | | 33/502 |
| 2015/0377617 A1 * | 12/2015 | Ould | G01B 21/04 |
| | | | 702/168 |
| 2017/0370689 A1 | 12/2017 | Hemmings et al. | |

OTHER PUBLICATIONS

Sesko, "Optical Configuration for Measurement Device," U.S. Appl. No. 14/973,431, filed Dec. 17, 2015, 43 pages.

* cited by examiner

METHOD FOR OPERATING A COORDINATE MEASURING MACHINE

CROSS-REFERENCE TO RELATED APPLICATION(S)

This application is a continuation-in-part of U.S. patent application Ser. No. 15/192,799, now U.S. Pat. No. 9,970,744, entitled "METHOD FOR OPERATING A COORDINATE MEASURING MACHINE," filed Jun. 24, 2016, the disclosure of which is hereby incorporated herein by reference in its entirety.

BACKGROUND

Technical Field

This disclosure relates to precision metrology, and more particularly to signals in probes used with coordinate measuring machines.

Description of the Related Art

Coordinate measuring machines (CMMs) can obtain measurements of inspected workpieces. One exemplary prior art CMM described in U.S. Pat. No. 8,438,746 (the '746 patent), which is hereby incorporated herein by reference in its entirety, includes a probe for measuring a workpiece, a movement mechanism for moving the probe, and a controller for controlling the movement. CMMs employing mechanical contact probes are also described in U.S. Pat. Nos. 6,971,183 and 6,487,785, which are hereby incorporated herein by reference in their entirety. A CMM including a surface scanning probe is described in U.S. Pat. No. 7,652,275, which is hereby incorporated herein by reference in its entirety. As disclosed therein, a scanning probe such as a mechanical contact probe or a non-contact optical probe may scan across the workpiece surface.

In various CMMs which employ scanning probes, measurement synchronization trigger signals trigger measurements from CMM scales or encoders (e.g., linear and rotary scales or encoders) that track an overall position and orientation of the scanning probe (e.g., its base position) in the machine coordinate system, as well as triggering a local surface measurement from the scanning probe. The scanning probe measurement is in a local coordinate system that is referenced to (or measured relative to) the scanning probe base. It is known that there may be a delay or deviation between the time when a measurement synchronization trigger signal latches the CMM scales and the time related to a signal sample period or timing of the scanning probe. The deviation may arise from signal acquisition delays, signal processing delays (including analog to digital conversion) and signal transmission delays, or the like. When such a timing discrepancy exists, the CMM scale measurement data and the scanning probe measuring data cannot be combined into an accurate measurement. The '746 patent, incorporated above, is one prior art reference that describes this problem and various prior art solutions, in detail. As described in the '746 patent, prior art solutions include sending a global trigger signal to all subsystems of a CMM, and/or precisely detecting and calibrating the various delays in the various subsystems, and/or "time stamping" and/or adjusting the measurement data from the various subsystems. The '746 patent also notes that, when the various subsystems include local digital electronics and processing, the limited number of wires available in typical CMM systems may prevent providing a dedicated line or channel for each desired timing signal. Thus, the complexity and/or cost of signal transmission and/or decoding may increase. The '746 patent notes that, even after all of the aforementioned problems are addressed, the phase of local clocks in various digital subsystems may disagree within a clock period. The '746 patent discloses providing a synchronization signal in addition to a measurement trigger signal. The synchronization signal is used to phase-synchronize various local clocks. The trigger signal defines the instant for triggering the measured value acquisition by the various subsystems, which then acquire their measurements in a time-quantified manner. However, shortcomings regarding system retrofit compatibility (e.g., for new probes), limited electrical connections for scanning probes (e.g., at articulated probe connection joints), and with regard to processing options in "smart probes," remain in the method disclosed in the '746 patent, as well as other prior art methods of measurement synchronization in a CMM. Further improvements and alternatives for CMM scanning probe measurement data synchronization are desired.

A method is disclosed for operating a coordinate measuring machine (CMM) including a CMM control system, a surface scanning probe that measures a workpiece surface by outputting probe workpiece measurements, and a probe measurement timing subsystem. The method comprises: operating the CMM control system to output measurement synchronization trigger signals at predictable times; operating the probe measurement timing subsystem to determine the predictable times; operating the CMM to define a first probe workpiece measurement sample period that has a first sampling duration that is relatively shorter than a second sampling duration, and that provides a faster type of probe workpiece measurement that has a first level of accuracy; operating the CMM to define a second probe workpiece measurement sample period that has a second sampling duration that is relatively longer than the first sampling duration, and that provides a slower type of probe workpiece measurement that has a second level of accuracy that is better than the first level of accuracy; and operating the CMM to perform of set of measurement operations including the first and second probe workpiece measurement sample periods, the set of measurement operations comprising:

a) initiating a current instance of the first probe workpiece measurement sample period at a first measurement lead time before a first measurement synchronization trigger signal and within a low-latency time window close to the first measurement synchronization trigger signal, wherein the first measurement synchronization trigger signal occurs at the next predictable time of the measurement synchronization trigger signals;

b) operating the CMM control system to output the first measurement synchronization trigger signal at the next predictable time and latch a first set of CMM position coordinate values associated with the first measurement synchronization trigger signal;

c) operating the surface scanning probe to output a current instance of the faster type of probe workpiece measurement associated with the current instance of a first probe workpiece measurement sample period, at a first output time that is associated with the first measurement synchronization trigger signal and that ends within the low-latency time window close to the first measurement synchronization trigger signal;

d) initiating a current instance of the second probe workpiece measurement sample period at a second measurement time that is defined relative to its corresponding operative measurement synchronization trigger signal, wherein the corresponding operative measurement synchronization trigger signal is one of the first measurement synchronization trigger signal or a second measurement synchronization trigger signal that occurs subsequent to the first measurement synchronization trigger signal, e) operating the surface scanning probe to output a current instance of the slower type of probe workpiece measurement associated with the current instance of the second probe workpiece measurement sample period, at a second output time that is associated with the corresponding operative measurement synchronization trigger signal; and f) operating the CMM control system to associate the current instance of the slower type of probe workpiece measurement with a properly combinable set of CMM position coordinate values that are determined based at least partially on a set of CMM position coordinate values associated with the corresponding operative measurement synchronization trigger signal.

In various implementations, a properly combinable set of CMM position coordinate values are latched at a time that approximately coincides with an effective sample time of the of the combined instance (e.g., the current instance) of the second probe workpiece measurement sample period. In some implementations, the effective sample time may be the average time of a plurality of measurement samples included in the current instance of the second probe workpiece measurement sample period, or approximately the average or center of the measurement duration of that sample period. In some implementations, a properly combinable set of CMM position coordinate values are latched at a time that precisely coincides with the effective sample time of the combined instance of the second probe workpiece measurement sample period. In other implementations, a properly combinable set of CMM position coordinate values are latched at a time that only approximately coincides (e.g., within an allowed time difference) with the effective sample time of the combined instance of the second probe workpiece measurement sample period. In general, the allowed difference is small enough that the CMM provides its desired or specified performance and/or accuracy, despite the presence of the allowed difference.

Various details and alternative implementations consistent with the above summary are described in greater detail below, particularly with reference to the description of FIGS. 6-9.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Scanning probes that include local signal processing (which may be characterized as "smart probes"), may include adjustable noise filters and/or measurement averaging or the like, provided in the probe. Related parameters may be adjusted by program instructions that are used to control the CMM and/or the probe. The parameters may be changed (e.g., downloaded to the probe) at any time during the execution of an inspection routine for a workpiece, depending on the required accuracy for measuring a particular feature, for example. When such parameters are changed, the delays or timing deviations outlined previously are inherently affected. In general, it may be desired to retrofit such smart probes onto older host systems that did not anticipate the smart probe features, and therefore lack the capability of adjusting such parameters and/or compensating for such frequently changing timing deviations in a flexible and easy to use manner. Furthermore, host systems may also lack a signal line and/or data transmission protocol which can support a synchronization signal of the type disclosed in the '746 patent, or the like. Therefore, according to principles disclosed herein, it may be desirable to compensate for such timing deviations, including those resulting from intentional parameter changes, in a probe measurement timing subsystem that is easily added to a host CMM. In some embodiments, the probe measurement timing subsystem operations may be divided between circuits internal to the probe and an external circuit connected to the probe. In other embodiments, the probe measurement timing subsystem operations may be implemented entirely in a circuit internal to the probe. A brief summary of such a system and method follows.

DETAILED DESCRIPTION

Figure 1:
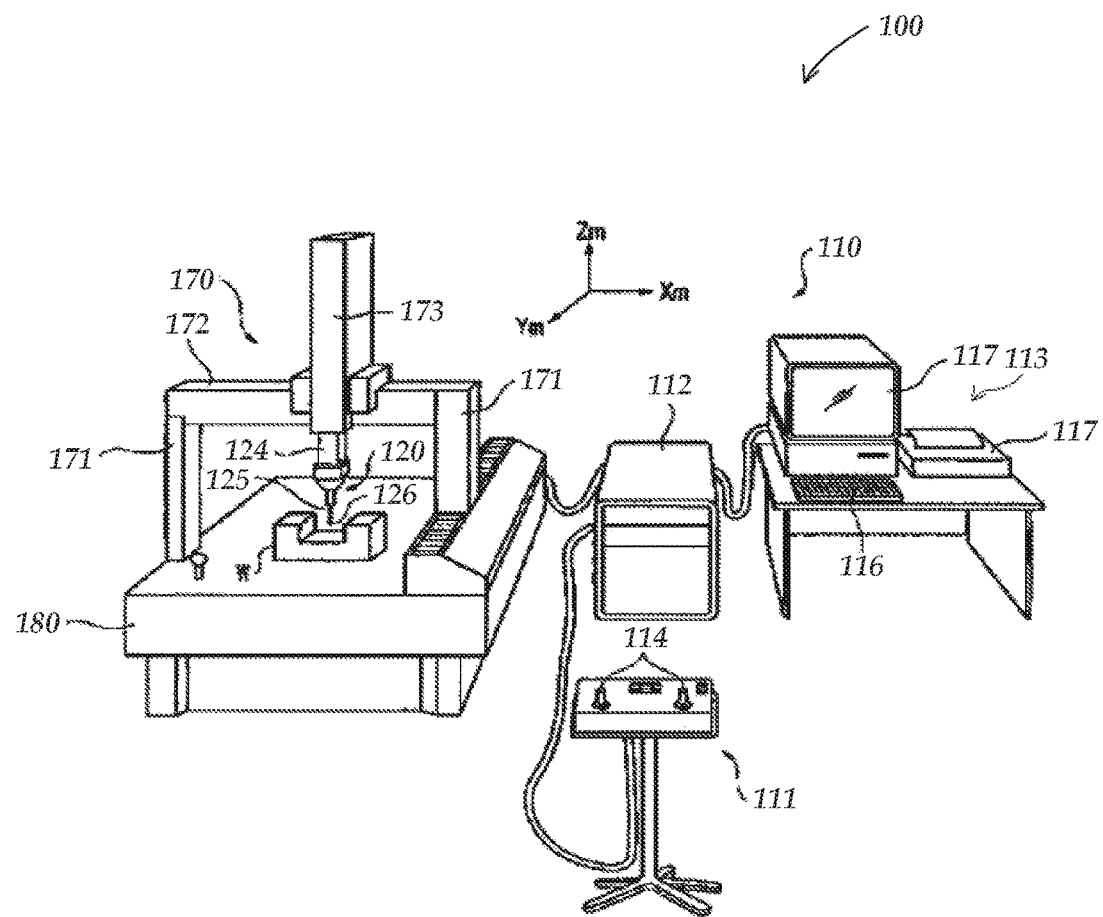
FIG. 1 is a diagram showing various typical components of a CMM.

FIG. 1 is a diagram showing various typical components of a CMM 100. The CMM 100 includes a CMM control system 110, and a surface scanning probe 120. The CMM control system 110 includes an operating unit 111, a motion controller 112 that controls movements of the CMM 100, and a host computer 113. The operating unit 111 is coupled to the motion controller 112 and may include joysticks 114 for manually operating the CMM 100. The host computer 113 is coupled to the motion controller 112 and operates the CMM 100 and processes measurement data for a workpiece W. The host computer 113 includes input means 116 (e.g., a keyboard, etc.) for inputting, for example, measurement conditions, and output means 117 (e.g., a display, printer, etc.) for outputting, for example, measurement results.

The CMM 100 includes a drive mechanism 170 which is located on a surface plate 180, and an attachment portion 124 for attaching the scanning probe 120 to the drive mechanism 170. The drive mechanism 170 includes x-axis, y-axis, and z-axis slide mechanisms 172, 171, and 173, respectively, for moving the scanning probe 120 three-dimensionally. A stylus 125 attached to the end of the scanning probe 120 includes a contact portion 126. The stylus 125 is attached to a stylus suspension portion of the scanning probe 120, which allows the contact portion 126 to freely change its position in three directions when the contact portion 126 moves along a measurement path on the surface of the workpiece W.

Figure 2:
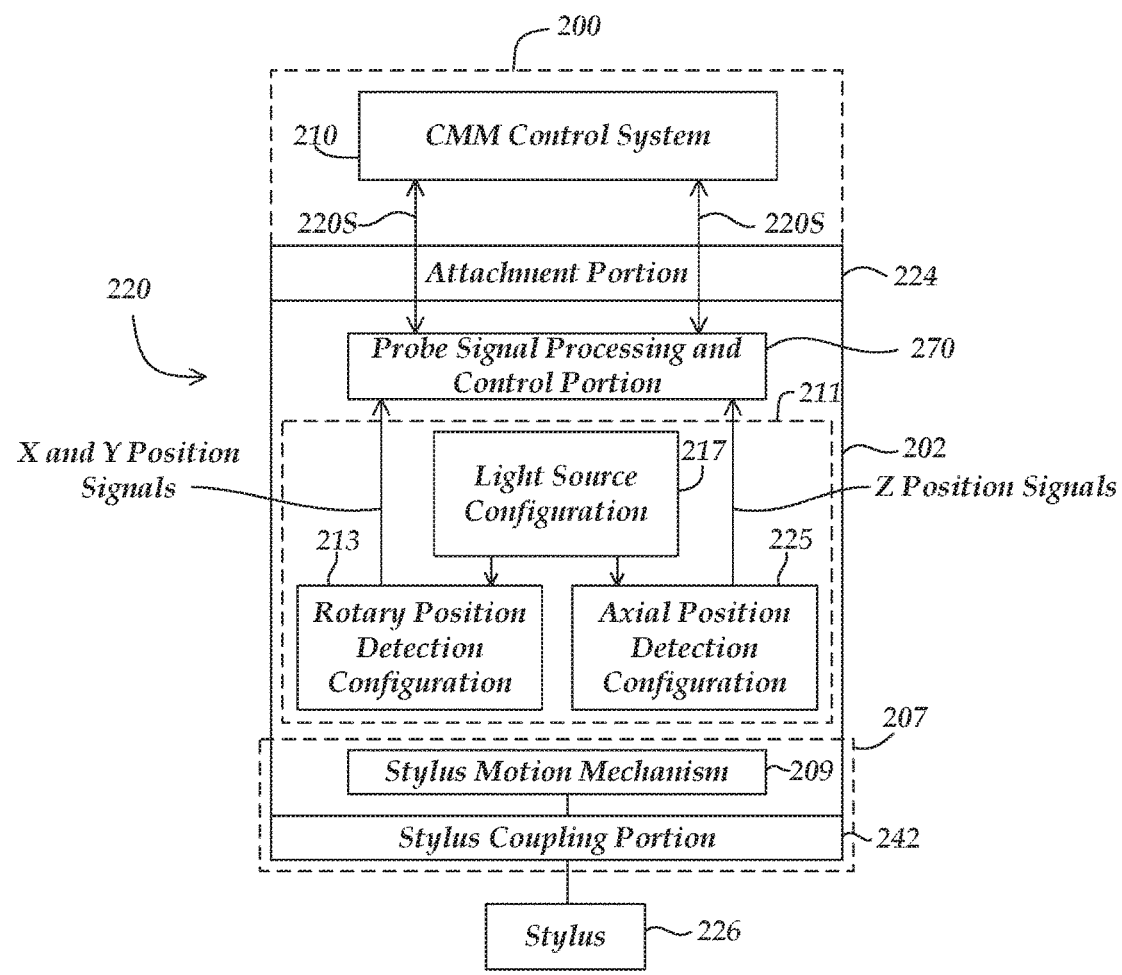
FIG. 2 is a block diagram showing various elements of a scanning probe as coupled to a CMM and providing X, Y and Z position signals.

FIG. 2 is a block diagram showing various elements of a surface scanning probe 220 as coupled to a CMM 200 by an attachment portion 224 and providing X, Y and Z position signals. The CMM 200 includes a CMM control system 210. The scanning probe 220 includes a probe main body 202 which incorporates a stylus suspension portion 207, a stylus position detection portion 211, and a probe signal processing and control portion 270. The stylus suspension portion 207 includes a stylus coupling portion 242 and a stylus motion mechanism 209. The stylus coupling portion 242 is rigidly coupled to a stylus 226. The stylus motion mechanism 209 is configured to enable axial motion of the stylus coupling portion 242 and attached stylus 226 along an axial direction, and to enable rotary motion of the stylus coupling portion 242 and attached stylus 226 about a rotation center. In the implementation shown in FIG. 2, the surface scanning probe 220 is a contact type surface scanning probe that senses a variable amount of deflection of the stylus 226.

As shown in FIG. 2, the stylus position detection portion 211 includes a light source configuration 217, a rotary position detection configuration 213, and an axial position detection configuration 225. The rotary position detection configuration 213 receives light from the light source configuration 217 and outputs X and Y position signals. The axial position detection configuration 225 receives light from the light source configuration 217 and outputs a Z position signal. The probe signal processing and control portion 270 is configured to receive the X, Y and Z position signals and output signals 220S to the CMM control system 210 which are indicative of a 3-D position of the stylus coupling portion 242 and/or of the contact portion of the attached stylus 226 as the contact portion moves along a surface of a workpiece W that is being measured. In some implementations, the probe signal processing and control portion 270 may be configured to convert analog X, Y and Z position signals to digital values and average a plurality of samples of X, Y and Z position values in order to provide signals 220S including probe workpiece measurements to the CMM control system 210. The probe signal processing and control portion 270 may also be configured to receive commands from the CMM control system 210 for how to process X, Y and Z position signals.

In some implementations, the stylus position detection portion 211 may be similar to a stylus position detection portion disclosed in U.S. patent application Ser. No. 14/973,431, now U.S. Pat. No. 9,803,972, which is hereby incorporated herein by reference in its entirety. It should be appreciated that stylus detection portion 211 includes optical detection configurations. However, a stylus detection portion employing alternative types of detection configurations may be incorporated in a surface scanning probe suitable for a CMM configured and operated according to the principles disclosed herein. For example, a stylus detection portion may employ electromagnetic deflection sensors (e.g., linear variable differential transformer sensors) or strain gauges.

Figure 3:
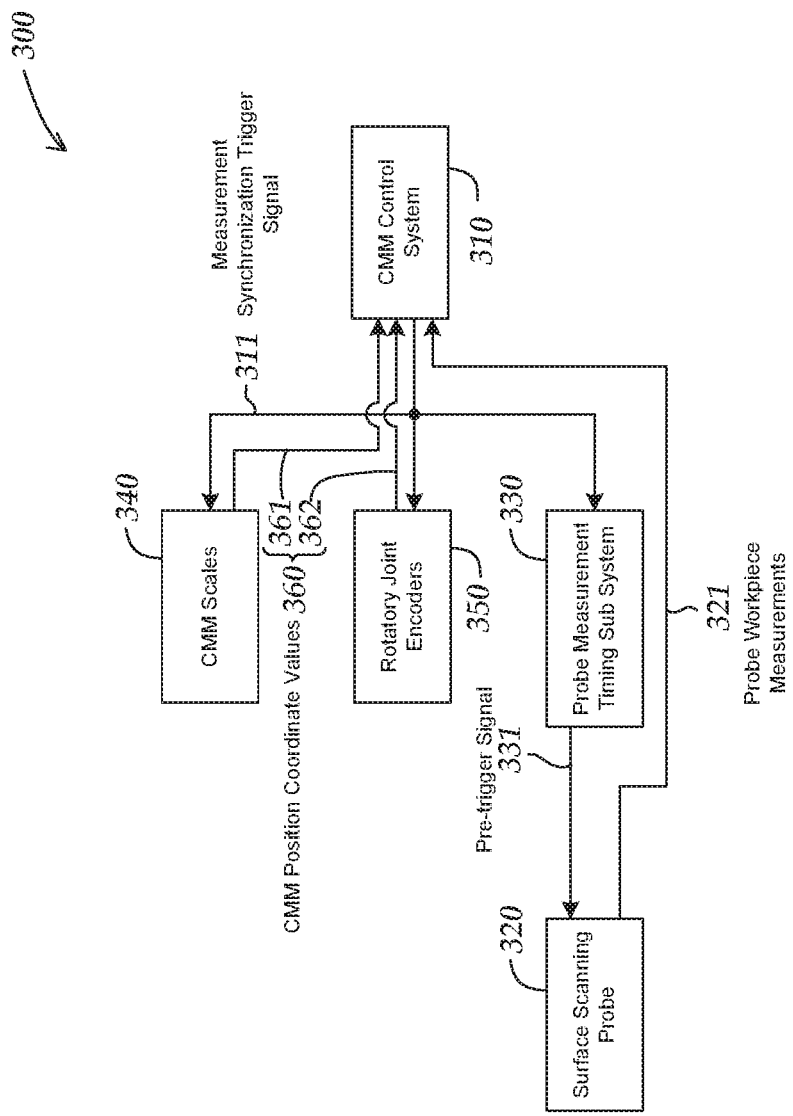
FIG. 3 is a block diagram showing various elements of a CMM.

FIG. 3 is a block diagram showing various elements of a CMM 300. The CMM 300 comprises a CMM control system 310, a surface scanning probe 320 that measures a workpiece surface by outputting probe workpiece measurements 321, a probe measurement timing subsystem 330, CMM scales 340 and rotary joint encoders 350. The CMM control system is operable to output a measurement synchronization trigger signal 311 at predictable times. The probe measurement timing subsystem 330 is operable to determine the predictable times, and to determine a current duration of a probe workpiece measurement sample period during which the surface scanning probe 320 acquires measurement data associated with a single instance of the output probe workpiece measurements 321. The probe measurement timing subsystem 330 is operable to determine a pre-trigger lead time that is a fraction of the current duration of the probe workpiece measurement sample period. The probe measurement timing subsystem 330 is operable to initiate a current instance of the probe workpiece measurement sample period at the pre-trigger lead time before a next predictable time of the measurement synchronization trigger signal 311, and determine an associated current instance of the probe workpiece measurement 321. More specifically, the probe measurement timing subsystem 330 initiates the current instance of the probe workpiece measurement sample period by outputting a pre-trigger signal 331 to the surface scanning probe 320. The CMM control system 310 is operable to output a current measurement synchronization trigger signal 311 at the next predictable time and latch a current set of CMM position coordinate values 360 associated with the current measurement synchronization trigger signal. Each set of the CMM position coordinate values 360 includes CMM scale values 361 from the CMM scales 340 and rotary joint encoder values 362 from the rotary joint encoders 350. The surface scanning probe 320 is operable to output the current instance of the probe workpiece measurement 321 at a time associated with the current measurement synchronization trigger signal, such that the CMM control system 310 associates the current instance of the probe workpiece measurement 321 with the current set of CMM position coordinate values 360.

If a sample period were to begin at the same time as an instance of the measurement synchronization trigger signals 311, a corresponding instance of the probe workpiece measurements 321 would include an error component resulting from a distance the surface scanning probe 320 has moved since the beginning of the sample period. Therefore, the configuration of the CMM 300 and the operating methods described herein are especially suitable at mitigating this error component by initiating the current instance of the probe measurement sample period according to the pre-trigger lead time.

In various implementations, the probe measurement timing subsystem 330 may be located partly or wholly in the surface scanning probe 320. In some implementations, all or part of the probe measurement timing subsystem 330 may be located proximate to the CMM control system 310. In some implementations, the probe measurement timing subsystem 330 may be located in an interchangeable card connected to the CMM control system 310. In some implementations, the interchangeable card may be specifically associated with at least one of an individual surface scanning probe 320, or a model or type of the surface scanning probe 320.

Figure 4:
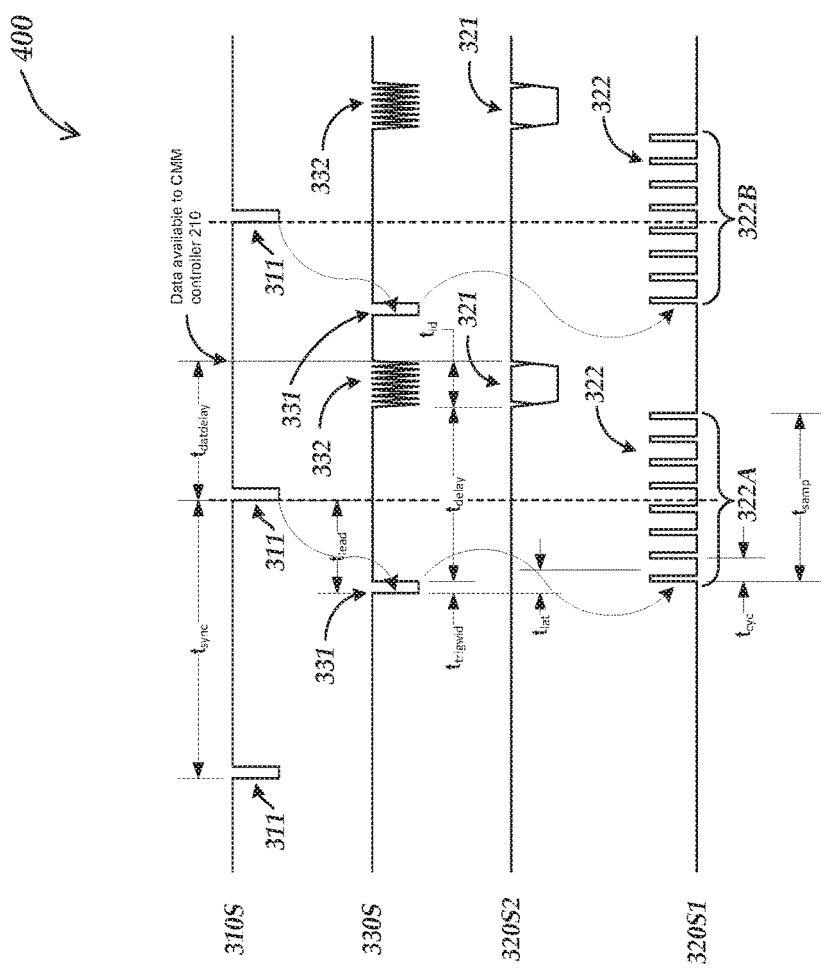
FIG. 4 is a timing diagram showing operations of the CMM of FIG. 3.

FIG. 4 is a timing diagram 400 showing operations of the CMM 300. As shown in FIG. 4, the CMM control system 310 outputs a signal 310S including repeated measurement synchronization trigger signals 311 at a trigger period $t_{sync}$. In some implementations, the trigger period $t_{sync}$ may be in a range of 200 μs to 1,000 μs. As previously described with respect to FIG. 3, the probe measurement timing subsystem 330 initiates the current instance of the probe workpiece measurement sample period (e.g., a sample period 322A or a sample period 322B) by outputting pre-trigger signals 331 to the surface scanning probe 320 through a bidirectional signal communication 330S. The surface scanning probe 320 generates a signal 320S1 including analog sample to digital conversion (ADC) triggers 322 during probe workpiece measurement sample periods which are initiated in response to the pre-trigger signals 331. The surface scanning probe 320 outputs a signal 320S2 including probe workpiece measurements 321 to the CMM control system 310 based on data sampled during the workpiece measurement sample periods. The probe measurement timing subsystem 330 is also configured to output data clock signals 332 corresponding to the probe workpiece measurements 321 to the CMM control system 310 via the bidirectional signal communication 330S. As previously outlined, the probe measurement timing subsystem 330 may reside partly or wholly in the surface scanning probe 320. In various embodiments, timing or clock signals depicted for the bidirectional signal communication 330S may originate in a portion of the probe measurement timing subsystem 330 located either inside or outside the surface scanning probe 320.

In some implementations, operating the probe measurement timing subsystem 330 to determine the predictable times may comprise inputting the repeated measurement synchronization trigger signals 311 to the probe measurement timing subsystem 330 at the trigger period $t_{sync}$, and determining a timing of the measurement synchronization trigger signals 311. In some implementations, operating the probe measurement timing subsystem 330 to initiate a current instance of the probe measurement sample period at the pre-trigger lead time before a next predictable time of the measurement synchronization trigger signals 311 may comprise initiating the current instance of the probe measurement sample period at a time after a previous measurement synchronization trigger signal 311 that corresponds to the pre-trigger lead time before the next predictable time of the measurement synchronization trigger signals 311.

As shown in FIG. 4, the surface scanning probe 320 acquires measurement data associated with a single instance of the output probe workpiece measurements during a probe workpiece measurement sample period $t_{samp}$. In some implementations, the probe measurement timing subsystem may be operated to determine a pre-trigger lead time $t_{lead}$ that is approximately one half of the current duration of the probe workpiece measurement sample period $t_{samp}$. This results in a measurement synchronization trigger signal 311 which is approximately centered in a sample period (e.g., the sample period 322A or the sample period 322B).

The pre-trigger lead time $t_{lead}$ may be determined as follows. The probe measurement timing subsystem 330 may initiate the current instance of the probe workpiece measurement sample period by outputting a pre-trigger signal 331 to the surface scanning probe 320 at a pre-trigger lead time $t_{lead}$ before the next predictable time of the measurement synchronization trigger signal 311. During a single probe workpiece measurement sample period (e.g., the sample period 322A or the sample period 322B) the surface scanning probe 320 may acquire n samples at a sample timing interval $t_{cyc}$. In the implementation shown in FIG. 4, n is 8. The surface scanning probe 320 may begin an instance of a probe workpiece measurement sample period with a total system latency $t_{lat}$ after an instance of the pre-trigger signals 331. The pre-trigger lead time $t_{lead}$ may then be determined by the expression:

$$t_{lead} = \left(\left(\frac{n}{2}\right) - 1\right)t_{cyc} + t_{lat} + \left(\frac{t_{cyc}}{2}\right). \quad \text{Eq. (1)}$$

In some implementations, the sample timing interval $t_{cyc}$ may be in a range of 5 µs to 7 µs and the total system latency $t_{lat}$ may be in a range of 1 µs to 2 µs. The pre-trigger lead time $t_{lead}$ may be in a range of 1 µs to 200 µs.

In the implementation shown in FIG. 4, the control system 310 receives the probe workpiece measurements 321 with a data delay $t_{datdelay}$ after the corresponding measurement synchronization signal 311. The surface scanning probe 320 begins outputting the probe workpiece measurements at a time corresponding to a delay $t_{delay}$ after an instance of the pre-trigger signals 331. Each instance of the pre-trigger signals 331 corresponds to a trigger width $t_{trigwid}$ which is the width of the instances of the pre-trigger signals 331. The surface scanning probe 320 outputs the probe workpiece measurements 321 to the CMM control system 310 over a transmission time $t_{id}$. The data delay t then $t_{datdelay}$ may be determined by the expression:

$$t_{datdelay} = t_{trigwid} + t_{delay} + t_{id} - t_{lead} \quad \text{Eq. (2)}$$

In some implementations, the trigger width $t_{trigwid}$ may be in a range of 200 ns to 300 ns, the delay $t_{delay}$ may be in a range of 5 µs to 350 µs and the transmission time $t_{id}$ may be in a range of 25 µs to 35 µs.

Figure 5:
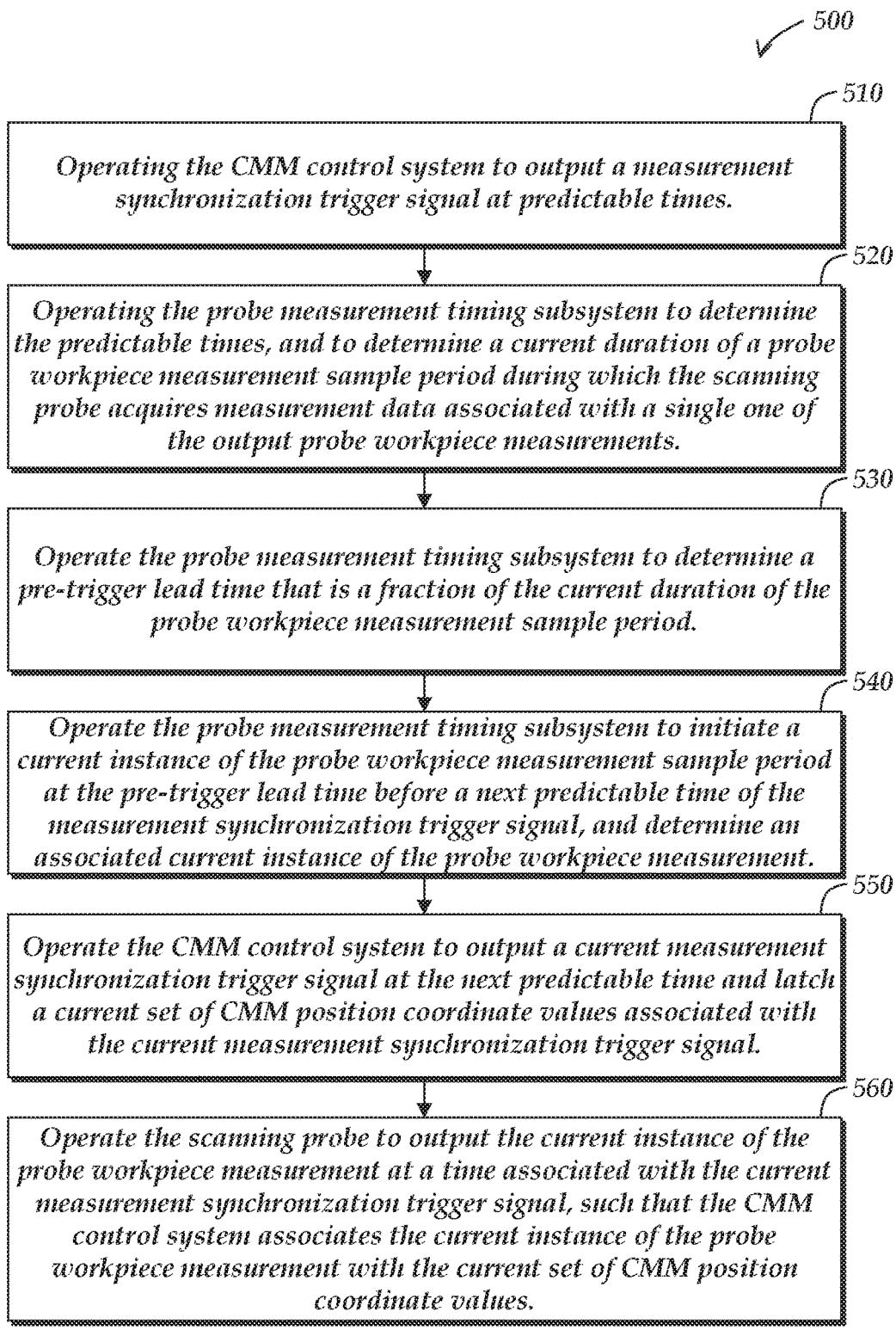
FIG. 5 is a flow diagram showing a method for operating a CMM.

FIG. 5 is a flow diagram 500 showing a method for operating a CMM. The CMM includes a CMM control system, a surface scanning probe that measures a workpiece surface by outputting probe workpiece measurements, and a probe measurement timing subsystem.

At a block 510, the CMM control system is operated to output a measurement synchronization trigger signal at predictable times.

At a block 520, the probe measurement timing subsystem is operated to determine the predictable times, and to determine a current duration of a probe workpiece measurement sample period during which the scanning probe acquires measurement data associated with a single one of the output probe workpiece measurements.

At a block 530, the probe measurement timing subsystem is operated to determine a pre-trigger lead time that is a fraction of the current duration of the probe workpiece measurement sample period.

At a block 540, the probe measurement timing subsystem is operated to initiate a current instance of the probe workpiece measurement sample period at the pre-trigger lead time before a next predictable time of the measurement synchronization trigger signal, and determine an associated current instance of the probe workpiece measurement.

At a block 550, the CMM control system is operated to output a current measurement synchronization trigger signal at the next predictable time and latch a current set of CMM position coordinate values associated with the current measurement synchronization trigger signal.

At a block 560, the scanning probe is operated to output the current instance of the probe workpiece measurement at a time associated with the current measurement synchronization trigger signal, such that the CMM control system associates the current instance of the probe workpiece measurement with the current set of CMM position coordinate values.

Figure 6:
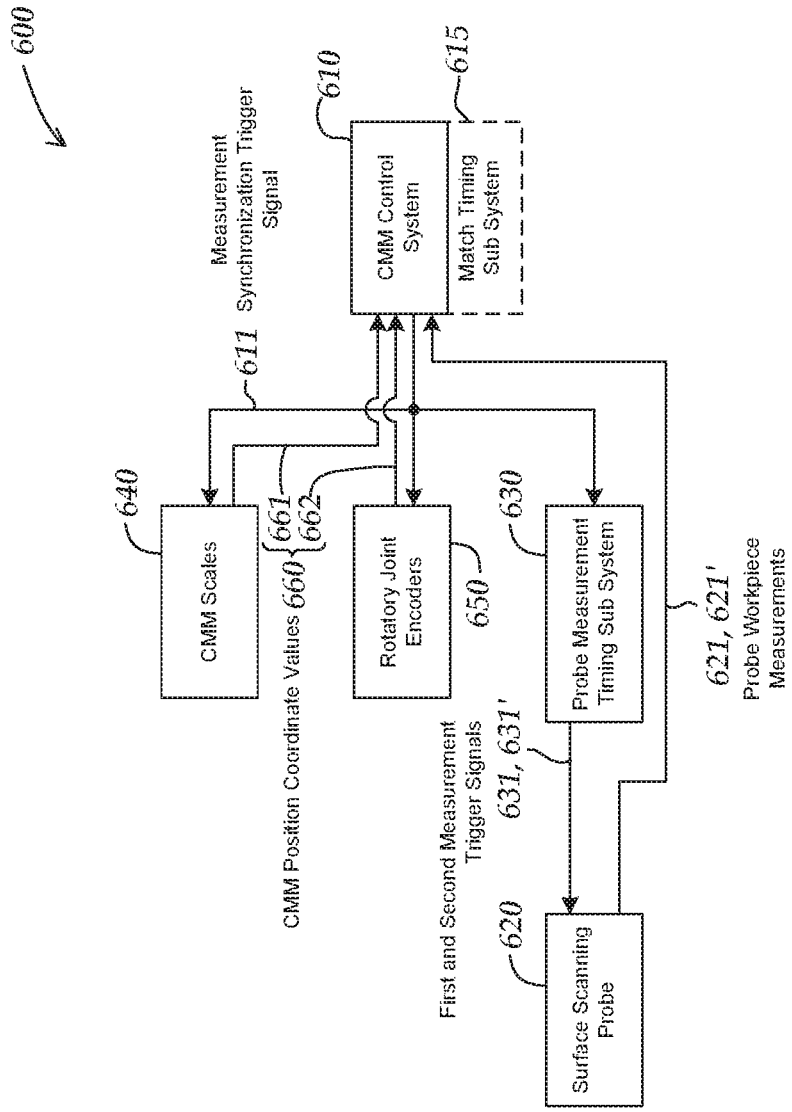
FIG. 6 is a block diagram showing various elements of a CMM.

FIG. 6 is a block diagram showing various elements of a CMM 600. The CMM 600 comprises a CMM control system 610, a surface scanning probe 620 that measures a workpiece surface by outputting probe workpiece measurements, a probe measurement timing subsystem 630, a match timing subsystem 615 (which may be optional in some implementations), CMM scales 640, and rotary joint encoders 650. The CMM control system 610 is operable to output a measurement synchronization trigger signal 611 at predictable times. In various implementations, coincident with or approximately coincident with outputting a current measurement synchronization trigger signal 611, the CMM control system 610 may latch a current set of CMM position coordinate values 660 (e.g., reflecting the motion control position of the various axes of the CMM) associated with that current measurement synchronization trigger signal 611. For example, each set of the CMM position coordinate values 660 includes CMM scale values 661 from the CMM scales 640 and rotary joint encoder values 662 from the rotary joint encoders 650. To determine a workpiece measurement, the CMM position coordinate values 660 are combined with displacement or deflection data that characterize the displacement coordinates of the contact portion 126 of the stylus 125. Such data is referred to herein as probe workpiece measurements 621 and/or 621'. The match timing subsystem 615 may play a role in combining the CMM position coordinate values 660 and the probe workpiece measurements 621', as described further below.

In various implementations, as described in greater detail below, the probe workpiece measurements 621 may be acquired relatively faster and indicate the stylus deflection coordinates with less accuracy and/or more noise using a first sample period, and the probe workpiece measurements 621' may be acquired relatively slower and indicate the stylus deflection coordinates with better accuracy and/or less noise using a second sample period.

It should be appreciated that as used herein the term "sample period" may sometimes refer to the duration of a sample period, and/or may sometimes refer more globally to additional characteristics of the sample period, for example including the set of sampling operations and/or signal processing performed during the sample period.

It will be understood that relatively less accurate position or deflection measurements (e.g., using the relatively faster probe workpiece measurements 621) may be sufficient for servo control, wherein fast acquisition and response time may also be of value for high speed motion control (e.g., to decelerate quickly and avoid "overtravel" damage when the stylus 125 contacts a workpiece. In contrast, relatively more accurate position or deflection measurements (e.g., using the relatively slower probe workpiece measurements 621'), may be desirable for determining a workpiece surface location with higher accuracy and/or lower noise. For example, the relatively slower probe workpiece measurements 621' may combine more samples of the sensed stylus deflection, using filter or averaging, in order to improve measurement accuracy and/or meaningful resolution.

As previously indicated, the CMM control system 610 is operable to output a measurement synchronization trigger signal 611 at predictable times. For example, the predictable times may be associated with a fixed operating frequency of a motion control cycle, and/or measurement cycle, and/or the like. The probe measurement timing subsystem 630 is operable to determine the predictable times.

As described in greater detail below with respect to FIG. 7, the probe measurement timing subsystem 630 is further operable to determine a duration of a first probe workpiece measurement sample period during which the surface scanning probe 620 acquires measurement data associated with a first instance of the output probe workpiece measurements 621, and to determine a duration of a second probe workpiece measurement sample period during which the surface scanning probe acquires measurement data associated with a second instance of the output probe workpiece measurements 621', which includes more samples than the first probe workpiece measurement sample period. The probe measurement timing subsystem 630 is also operable to determine a first measurement lead time $t_{lead1}$ that, in some implementations, is desirably larger than a data transmission time between the surface scanning probe 620 and the CMM control system 610 for the output probe workpiece measurements 621. The probe measurement timing subsystem 630 is operable to initiate a current instance of the first probe workpiece measurement sample period at the first measurement lead time $t_{lead1}$ before a next predictable time of the measurement synchronization trigger signal 611.

In various implementations, the probe measurement timing subsystem 630 may be located partly or wholly in the surface scanning probe 620. In some implementations, all or part of the probe measurement timing subsystem 630 may be located proximate to or in the CMM control system 610. In some implementations, the probe measurement timing subsystem 630 may be located in an interchangeable card connected to the CMM control system 610. In some implementations, the interchangeable card may be specifically associated with at least one of an individual surface scanning probe 620, or a model or type of the surface scanning probe 620.

The surface scanning probe 620 is operable to output the first instance of the probe workpiece measurements 621 at a first time associated with the current measurement synchronization trigger signal 611, such that the CMM control system 610 associates the current instance of the first probe workpiece measurements with the current set of CMM position coordinate values 660. The probe measurement timing subsystem 630 is operable to initiate a current instance of the second probe workpiece measurement sample period at a second measurement time. The surface scanning probe 620 is operable to output the second instance of the probe workpiece measurements 621' at a second time associated with the current measurement synchronization trigger signal 611, such that the CMM control system 610 associates the current instance of the second probe workpiece measurements with the current set of CMM position coordinate values 660. As previously indicated, the current instance of the second probe workpiece measurements 621' and the associated current set of CMM position coordinate values 660, may be combined (e.g., in the CMM control system 610) to determine a high accuracy workpiece surface location measurement. In some implementations, the timing of the second probe workpiece measurements 621' and the associated current set of CMM position coordinate values 660 may be different. In such implementations, the match timing subsystem 615 may determine the timing difference and provide an adjustment value for the CMM position coordinate values 660, such that they are properly combinable corresponding to the same instant in time, as described in greater detail below with respect to FIG. 7.

Figure 8:
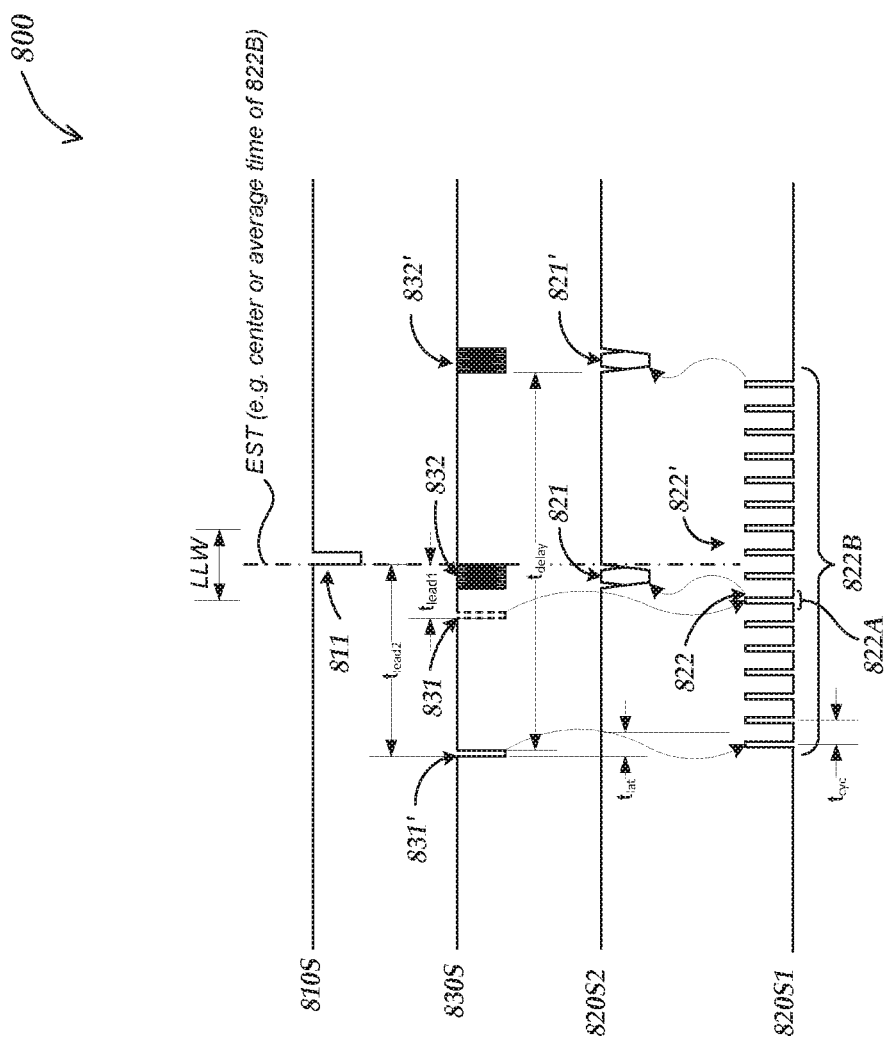
FIG. 8 is a timing diagram showing a second implementation of operations of the CMM of FIG. 6.

In some implementations, such as that shown in FIG. 8, the first probe workpiece measurement sample period may take place within the second probe workpiece measurement sample period, and the current instance of the first probe workpiece measurements 621 may share at least one common sample with the current instance of the second probe workpiece measurements 621'.

In various implementations, the match timing subsystem 615 may be located partly or wholly in the surface scanning probe 620, or proximate to or in the CMM control system 610. In some implementations, the match timing subsystem 615 may be located in an interchangeable card connected to the CMM control system 610. In some implementations, the interchangeable card may be specifically associated with at least one of an individual surface scanning probe 620, or a model or type of the surface scanning probe 620. In some implementations, the timing of the second probe workpiece measurements 621' and the associated current set of CMM position coordinate values 660 may be sufficiently close, or identical, in which case the match timing subsystem 615 may be omitted, or optional.

Figure 7:
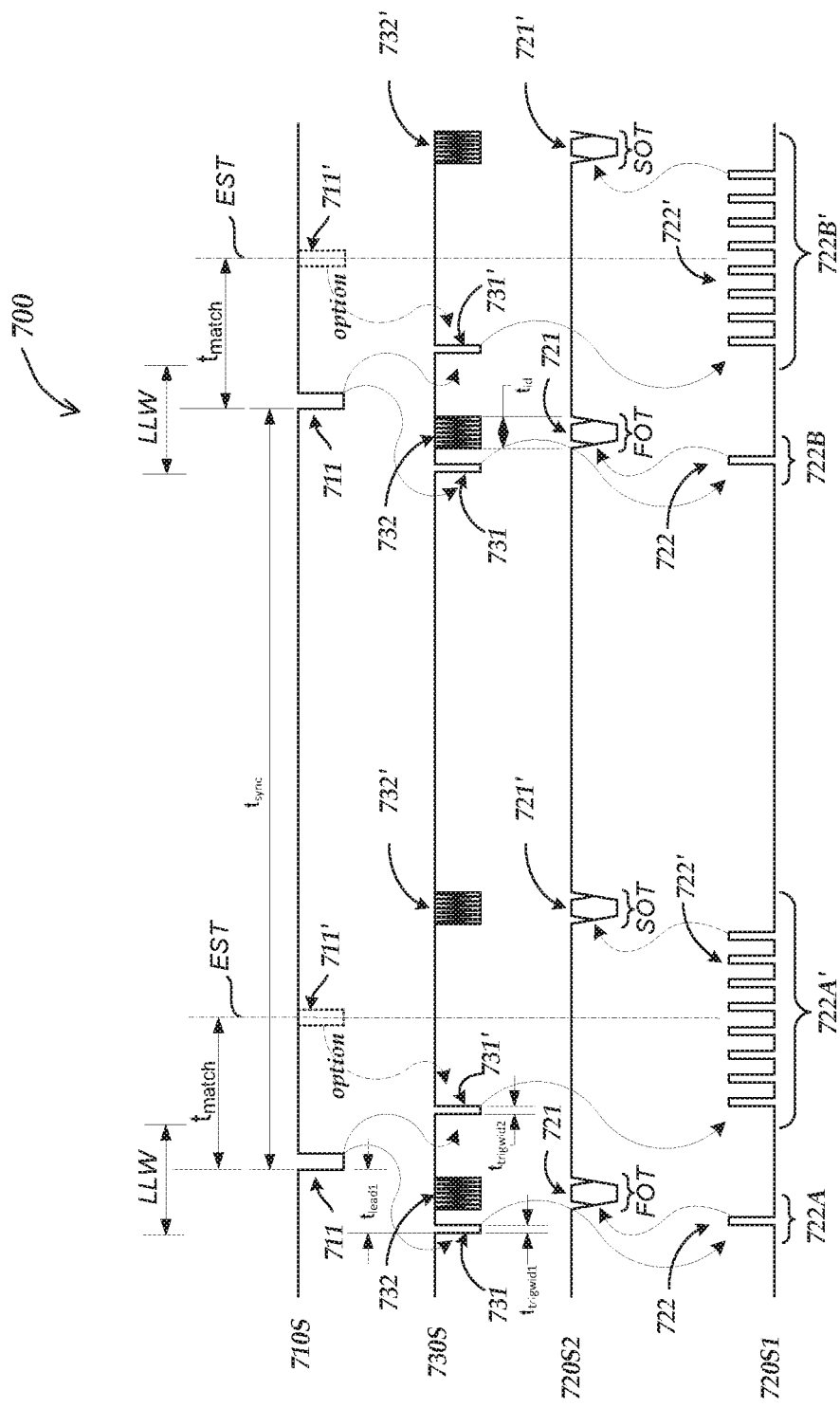
FIG. 7 is a timing diagram showing a first implementation of operations of the CMM of FIG. 6.

FIG. 7 is a timing diagram 700 showing a first implementation of operations of the CMM 600. FIG. 7 shows various signals numbered 7XX some of which may be understood by analogy to implementations of signals numbered 6XX in FIG. 6, except as otherwise described or implied below.

As shown in FIG. 7, a signal 710S (e.g., on a signal line) includes repeated measurement synchronization trigger signals 711 at a trigger period $t_{sync}$ (e.g., as output by the CMM control system 610, as previously described with respect to FIG. 6). In some implementations, the trigger period $t_{sync}$ may be in a range of 200 µs to 1,000 µs, although these values are exemplary only and not limiting.

As previously outlined with reference to FIG. 6, the probe measurement timing subsystem 630 may initiate a current instance of the first probe workpiece measurement sample period (e.g., a sample period 722A or a sample period 7226) by outputting first probe sample period trigger signals 731 to the surface scanning probe 620 through a bidirectional signal communication 730S. In various implementations the timing of the first probe sample period trigger signals 731 is determined such that it initiates a current instance of the first probe workpiece measurement sample period at a first measurement lead time $t_{lead1}$ before an associated (e.g., next) measurement synchronization trigger signal 711 and within a low-latency time window LLW close to the associated measurement synchronization trigger signal 711. In general, the low-latency time window LLW is defined such that it is small enough and close enough to the associated measurement synchronization trigger signal 711 such that the CMM provides its desired or specified performance and/or accuracy, despite the limited difference that it may allow between the effective sample time of the first probe workpiece measurement sample period (e.g., 722A) and the time of the associated measurement synchronization trigger signal 711.

The probe measurement timing subsystem 630 may also initiate a current instance of the second probe workpiece measurement sample period (e.g., a sample period 722A' or a sample period 7226') by outputting second probe sample period trigger signals 731' through the bidirectional signal communication 730S.

The surface scanning probe 620 generates a signal 720S1 including analog sample to digital conversion (ADC) triggers 722 (which have corresponding ADC measurements 722) during first probe workpiece measurement sample periods which are initiated in response to the first probe sample period trigger signals 731, and analog sample to digital conversion (ADC) triggers 722' (which have corresponding ADC measurements 722') during second probe workpiece measurement sample periods which are initiated in response to the second probe sample period trigger signals 731'. The surface scanning probe 620 outputs a signal 720S2 to the CMM control system 610 including a first instance of the output probe workpiece measurements 721 (based on data sampled during the first workpiece measurement sample period 722A) at a first output time FOT associated with a corresponding (e.g., next) measurement synchronization trigger signal 711. In various implementations, the first output time FOT ends within the low-latency time window LLW close to the corresponding (e.g., next) measurement synchronization trigger signal 711. In general, the low-latency time window LLW is defined such that it is small enough and close enough to the corresponding measurement synchronization trigger signal 711 such that the CMM provides its desired or specified performance (e.g., motion control performance) and/or accuracy, despite the limited difference that it may allow between the availability of the output probe workpiece measurements 721 (e.g., at the end of the first output time FOT, in a position register of the CMM control system 610) and the time of the associated measurement synchronization trigger signal 711.

The signal 720S2 output from the surface scanning probe 620 to the CMM control system 610 may also include a second instance of the output probe workpiece measurements 721' (based on data sampled during the second workpiece measurement sample period 722A'), at a second output time SOT associated with a corresponding operative measurement synchronization trigger signal (e.g., 711, or 711').

In one implementation illustrated in FIG. 7, the corresponding operative measurement synchronization trigger signal is the measurement synchronization trigger signal 711. The timing of the second probe sample period trigger signal 731' is determined such that it initiates a current instance of the second probe workpiece measurement sample period at a second measurement time that occurs after the first probe sample period trigger signal 731, and after the first output time FOT, and after the corresponding operative measurement synchronization trigger signal 711. The second output time SOT occurs after the first output time FOT. In this implementation the second workpiece measurement sample period 722A' has an effective sample time EST approximately in the middle of its set of individual measurement samples, which has a time difference $t_{match}$ relative to the corresponding operative measurement synchronization trigger signal 711. In order to overcome this time difference $t_{match}$ and provide a properly combinable set of CMM position coordinate values for the output probe workpiece measurement 721' corresponding to the current instance of the second probe workpiece measurement sample period, the properly combinable set of CMM position coordinate values are determined corresponding to a time that is approximately the same as the effective sample time EST of the current instance of the second probe workpiece measurement sample period 722A'. In one implementation the properly combinable set of CMM position coordinate values are a set of CMM position coordinate values extrapolated from the set of CMM position coordinate values latched at the time of the corresponding operative measurement synchronization trigger signal 711. The extrapolation is based on the time difference $t_{match}$ and a characterization of the rate of change of the CMM position coordinate values over a time period before the first measurement synchronization trigger signal, according to known principles. For example, with reference to FIG. 6, the timing difference $t_{match}$ may be determined and recorded in the match timing subsystem 615 according to previously outlined principles. The match timing subsystem 615 may further record and analyze a set of the previous CMM position coordinate values 660, latched at known times by previous measurement synchronization trigger signals 711, and determine a current velocity or rate of change of the CMM position coordinate values 660. Based on the rate of change and the time difference $t_{match}$ a properly combinable set of CMM position coordinate values may be determined by extrapolating the value of the set of CMM position coordinate values latched at the time of the corresponding operative measurement synchronization trigger signal 711 to a time that is approximately the same as the effective sample time EST of the current instance of the second probe workpiece measurement sample period 722A', according to known extrapolation methods.

Alternatively, in another implementation that is illustrated in FIG. 7, which provides a properly combinable set of CMM position coordinate values for the output probe workpiece measurement 721' corresponding to the current instance of the second probe workpiece measurement sample period, the properly combinable set of CMM position coordinate values are determined by providing a corresponding operative measurement synchronization trigger signal that is a second measurement synchronization trigger signal 711' (shown in dashed outline). In one implementation, the second probe workpiece measurement sample period 722A' may be initiated at a second measurement time (e.g., by the second probe sample period trigger signal 731') that is defined relative to the second measurement synchronization trigger signal 711'. In another implementation, the match timing subsystem 615 may be used or operated to generate the second measurement synchronization trigger signal 711', which is analogous to the measurement synchronization trigger signal 711, but which is primarily or only used to latch a properly combinable current set of CMM position coordinate values 660 at a time coincident with the effective sample time EST associated with a sample period 722A' and corresponding second probe workpiece measurement 721'. In either implementation, a properly combinable set of CMM position coordinate values are obtained, which corresponds to a time that is approximately the same as the effective sample time EST of the current instance of the second probe workpiece measurement sample period 722A'.

The probe measurement timing subsystem 630 is also configured to output data clock signals 732 and 732' corresponding to the first instance of the output probe workpiece measurements 721 and the second instance of the output probe workpiece measurements 721' to the CMM control system 610 via the bidirectional signal communication 730S. As previously outlined, the probe measurement timing subsystem 630 may reside partly or wholly in the surface scanning probe 620. In various embodiments, timing or clock signals depicted for the bidirectional signal communication 730S may originate in a portion of the probe measurement timing subsystem 630 located either inside or outside the surface scanning probe 620.

In the implementation shown in FIG. 7, the sample periods 722A and 722B include just one sample, whereas the sample periods 722A' and 722B' include eight samples. It should be appreciated that each number of samples is exemplary only, and not limiting. For example, in some implementations, a first probe workpiece measurement sample period may include more than one sample. In any case, relatively less accurate stylus position or deflection measurements (e.g., using the relatively faster or shorter sample periods 722A and 722B, which include relatively fewer samples) may be sufficient for servo control, wherein fast acquisition and response time may also be of value for high speed motion control (e.g., to decelerate quickly and avoid "overtravel" damage when the stylus 125 contacts a workpiece. In contrast, a CMM control system may subsequently or additionally rely on a second probe workpiece measurement sample period for relatively more accurate stylus position or deflection measurements (e.g., using the relatively slower or longer sample periods 722A' and 722B', which include relatively more samples), which may be desirable for determining a workpiece surface location with higher accuracy and/or lower noise. For example, the relatively slower or longer the sample periods 722A' and 722B' may provide more samples of the sensed stylus deflection, which may be filtered or averaged, in order to improve measurement accuracy and/or meaningful resolution.

Regarding operating the probe measurement timing subsystem 630 to determine the predictable times, related operations may comprise inputting the repeated measurement synchronization trigger signals 711 to the probe measurement timing subsystem 630 at the trigger period $t_{sync}$, and determining a timing of the measurement synchronization trigger signals 711. In some implementations, operating the probe measurement timing subsystem 630 to initiate a current instance of the probe measurement sample period at the first measurement lead time $t_{lead1}$ before a next predictable time of the measurement synchronization trigger signals 711 may comprise initiating the current instance of the probe measurement sample period at a time after a previous measurement synchronization trigger signal 711 that corresponds to the first measurement lead time $t_{lead1}$ before the next predictable time of the measurement synchronization trigger signals 711.

As outlined with respect to FIG. 6, the first measurement lead time $t_{lead1}$ is larger than a transmission time $t_{td}$ between the surface scanning probe and the CMM control system. In some embodiments, it may be advantageous if the first measurement lead time $t_{lead1}$ t is as small as possible to avoid latency errors, subject to the constraint that it should be long enough to allow enough time to transmit the data of the first probe workpiece measurement sample period to the CMM control system 610 so that the data is ready for use in the CMM control system (e.g., stored in a probe deflection data register) at the time of the associated measurement synchronization trigger signal 711.

Each instance of the first probe sample period trigger signals 731 corresponds to a trigger width $t_{trigwid1}$ which is the width of the instances of the first probe sample period trigger signals 731. Each instance of the second probe sample period trigger signals 731' corresponds to a trigger width $t_{trigwid2}$ which is the width of the instances of the second probe sample period trigger signals 731'. In some implementations, it may be desirable for the trigger width $t_{trigwid1}$ and the trigger width $t_{trigwid2}$ to have different values such that the surface scanning probe 620 may recognize whether to output the first instance of the probe workpiece measurements 721 or the second instance of the probe workpiece measurements 721'.

It will be appreciated that, according to the teachings previously outlined with reference to FIG. 4, the timing difference between the measurement synchronization trigger signal 311 and the effective sample time that corresponds to the sample period 322A (and the associated probe workpiece measurement 321) are negligible. Therefore, the operations outlined above in relation to the match timing subsystem 615 are not needed, and the match timing subsystem 615 is not needed to provide a high accuracy workpiece location measurement in that implementation. The same is true for the implementation shown in FIG. 8.

FIG. 8 is a timing diagram 800 showing a second implementation of operations of the CMM 600. FIG. 8 shows various signals numbered 8XX which may be understood to correspond to implementations of signals numbered 6XX in FIG. 6 and/or 7XX in FIG. 7. The implementation shown in FIG. 8 differs from that shown in FIG. 7, in that in FIG. 8 the first workpiece measurement sample period 822A is shorter than and included within the duration of the second workpiece measurement sample period 822B, and a first sample set of analog sample to digital conversion (ADC) triggers 822 included in the first workpiece measurement sample period 822A comprises at least one individual measurement sample that is shared with a second sample set of ADC triggers 822' included in the second workpiece measurement sample period 822B. It will be appreciated that the timing and duration of the first workpiece measurement sample period 822A (e.g., as initiated by the first probe sample period trigger signal 831 with the first lead time $t_{lead1}$) is such that each sample included in the first sample set of ADC triggers 822 occurs within the low-latency time window LLW close to the associated or corresponding operative measurement synchronization trigger signal 811, according to previously outlined principles. It will be appreciated that the timing of the second probe sample period trigger signal 831' initiates a current instance of the second probe workpiece measurement sample period 822B at a second measurement time that occurs at a second lead time $t_{lead2}$ before the corresponding operative measurement synchronization trigger signal 811, and before the first measurement lead time $t_{lead1}$, wherein the second lead time $t_{lead2}$ is determined such that the effective sample time EST of the current instance of the second probe workpiece measurement sample period 822B approximately coincides with the corresponding operative measurement synchronization trigger signal 811. Thus, a set of CMM position coordinate values latched by the corresponding operative measurement synchronization trigger signal 811 are a properly combinable set of CMM position coordinate values of the output probe workpiece measurement 821' corresponding to the current instance of the second probe workpiece measurement sample period 822B.

To further describe FIG. 8, in the illustrated implementation the CMM control system 610 outputs a signal 810S including repeated measurement synchronization trigger signals 811 at the trigger period $t_{sync}$. The probe measurement timing subsystem 630 initiates a current instance of the second probe workpiece measurement sample period (e.g., a sample period 822B) by outputting second probe sample period trigger signals 831' through the bidirectional signal communication 830S at a second measurement time $t_{lead2}$ before a next predictable time of the measurement synchronization trigger signals 811. The probe measurement timing subsystem 630 initiates a current instance of the first probe workpiece measurement sample period (e.g., a sample period 822A) by outputting first probe sample period trigger signals 831 to the surface scanning probe 620 through a bidirectional signal communication 830S. The surface scanning probe 620 generates a signal 820S1 including analog sample to digital conversion (ADC) triggers 822 (which have corresponding ADC measurements 822) during the first probe workpiece measurement sample period which are initiated in response to the trigger signal 831'. At least one analog sample to digital conversion (ADC) trigger 822' occurring within the first probe workpiece measurement sample period 822A, may designate at least one of the corresponding ADC measurements to be included as a sample associated with both the first and second probe workpiece measurement sample periods 822A and 822B.

The surface scanning probe 620 outputs a signal 820S2 including a first instance of the output probe workpiece measurements 821 and a second instance of the output probe workpiece measurements 821' to the CMM control system 610 based on data sampled during the first and second workpiece measurement sample periods, respectively. The probe measurement timing subsystem 630 is also configured to output data clock signals 832 and 832' corresponding to the probe workpiece measurements 821 and 821' to the CMM control system 610 via the bidirectional signal communication 830S. As previously outlined, the probe measurement timing subsystem 630 may reside partly or wholly in the surface scanning probe 620. In various embodiments, timing or clock signals depicted for the bidirectional signal communication 830S may originate in a portion of the probe measurement timing subsystem 630 located either inside or outside the surface scanning probe 620.

In some implementations which are similar to that shown in FIG. 8, a first probe workpiece measurement sample period may alternatively include more than one sample and share more than one common sample with the second probe workpiece measurement sample period.

In some implementations, operating the probe measurement timing subsystem 630 to determine the second measurement lead time $t_{lead2}$ may comprise determining a second measurement lead time $t_{lead2}$ that is approximately one half of the current duration of the second probe workpiece measurement sample period.

In some implementations, the CMM control system 610 may output repeated measurement synchronization trigger signals 811 at the trigger period $t_{sync}$, and operating the probe measurement timing subsystem to determine the predictable times may comprise inputting the repeated measurement synchronization trigger signals 811 to the probe measurement timing subsystem 630 at the trigger period $t_{sync}$, and determining a timing of the repeated measurement synchronization trigger signals 811.

In some implementations, operating the probe measurement timing subsystem 630 to initiate a current instance of the second probe measurement sample period 822B at the second measurement lead time $t_{lead2}$ before the next predictable time of the measurement synchronization trigger signal 811 may comprise initiating the current instance of the second probe measurement sample period 822B at a time after a previous measurement synchronization trigger signal 811 that corresponds to the second measurement lead time $t_{lead2}$ before the next predictable time of the measurement synchronization trigger signal 811.

The second measurement lead time $t_{lead2}$ may be determined in a similar manner to the pre-trigger lead time $t_{lead}$ described with respect to FIG. 4. During a single second probe workpiece measurement sample period (e.g., second probe measurement sample period 822B) the surface scanning probe 620 may acquire n samples at a sample timing interval $t_{cyc}$. In the implementation shown in FIG. 8, n is 16. The surface scanning probe 620 may begin an instance of a second probe workpiece measurement sample period with a total system latency $t_{lat}$ after an instance of the second probe sample period trigger signals 831. The second measurement lead time $t_{lead2}$ may then be determined by the expression:

$$t_{lead2} = \left(\left(\frac{n}{2}\right)-1\right)t_{cyc} + t_{lat} + \left(\frac{t_{cyc}}{2}\right). \quad \text{Eq. (3)}$$

Figure 9A:
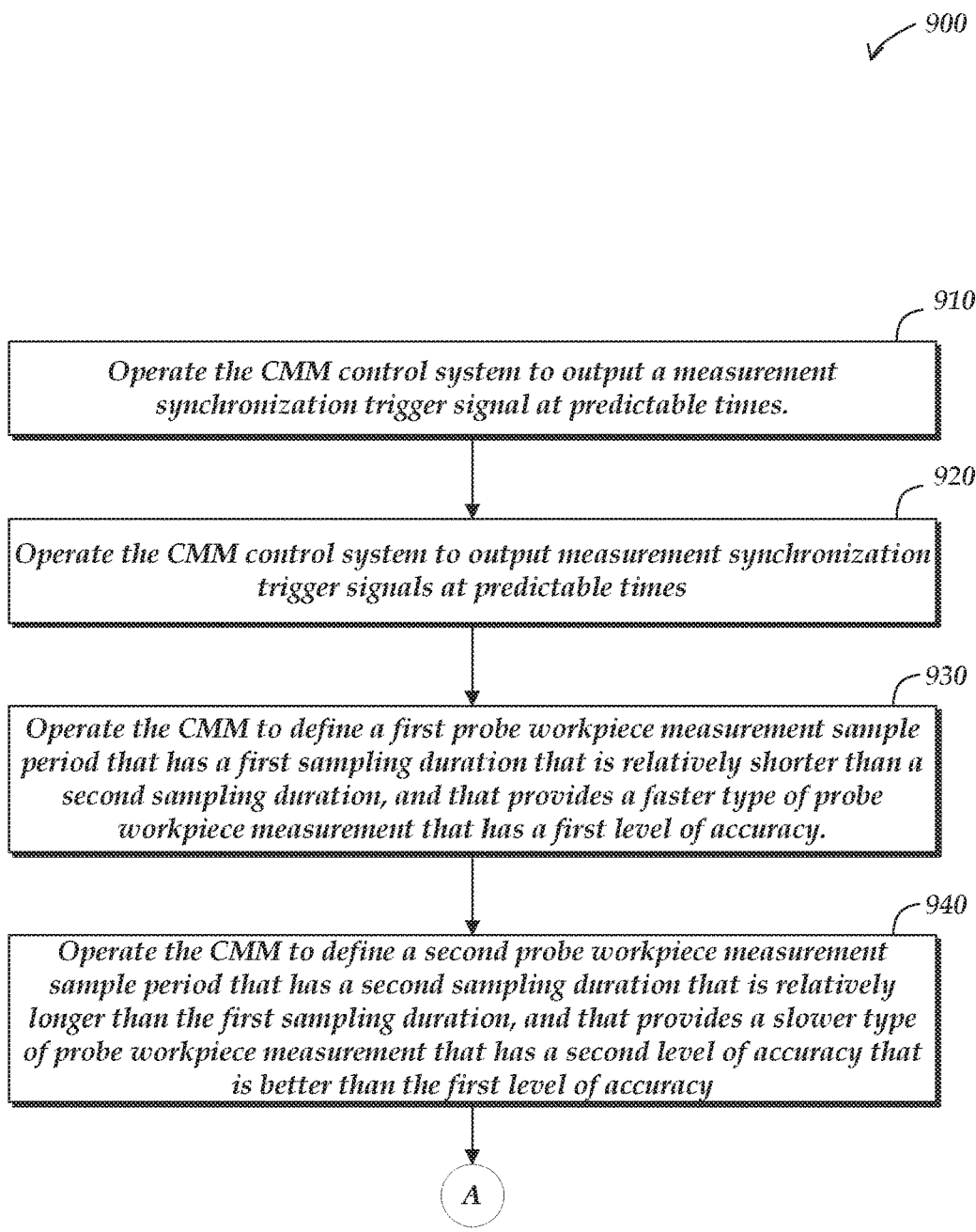
FIGS. 9A and 9B are flow diagrams showing a method for operating a CMM.
Figure 9B:

FIG. 9A and FIG. 9B show a flow diagram 900 showing the generally described operations of a method for operating a CMM according to principles outlined with reference to various implementations above. The CMM includes a CMM control system, a surface scanning probe that measures a workpiece surface by outputting probe workpiece measurements, and a probe measurement timing subsystem.

As shown in FIG. 9A, at a block 910, the CMM control system is operated to output a measurement synchronization trigger signal at predictable times.

At a block 920, the CMM control system is operated to output measurement synchronization trigger signals at predictable times.

At a block 930, the CMM is operated to define a first probe workpiece measurement sample period that has a first sampling duration that is relatively shorter than a second sampling duration, and that provides a faster type of probe workpiece measurement that has a first level of accuracy.

At a block 940, the CMM is operated to define a second probe workpiece measurement sample period that has a second sampling duration that is relatively longer than the first sampling duration, and that provides a slower type of probe workpiece measurement that has a second level of accuracy that is better than the first level of accuracy.

The block 940 continues to a block A which is continued in FIG. 9B.

As shown in FIG. 9B, at a block 950, the CMM is operated to perform of set of measurement operations including the first and second probe workpiece measurement sample periods, the set of measurement operations comprising:

a) initiating a current instance of the first probe workpiece measurement sample period at a first measurement lead time before a first measurement synchronization trigger signal and within a low-latency time window close to the first measurement synchronization trigger signal, wherein the first measurement synchronization trigger signal occurs at the next predictable time of the measurement synchronization trigger signals;

b) operating the CMM control system to output the first measurement synchronization trigger signal at the next predictable time and latch a first set of CMM position coordinate values associated with the first measurement synchronization trigger signal;

c) operating the surface scanning probe to output a current instance of the faster type of probe workpiece measurement associated with the current instance of a first probe workpiece measurement sample period, at a first output time that is associated with the first measurement synchronization trigger signal and that ends within the low-latency time window close to the first measurement synchronization trigger signal;

d) initiating a current instance of the second probe workpiece measurement sample period at a second measurement time that is defined relative to its corresponding operative measurement synchronization trigger signal, wherein the corresponding operative measurement synchronization trigger signal is one of the first measurement synchronization trigger signal or a second measurement synchronization trigger signal that occurs subsequent to the first measurement synchronization trigger signal, e) operating the surface scanning probe to output a current instance of the slower type of probe workpiece measurement associated with the current instance of the second probe workpiece measurement sample period, at a second output time that is associated with the corresponding operative measurement synchronization trigger signal; and f) operating the CMM control system to associate the current instance of the slower type of probe workpiece measurement with a properly combinable set of CMM position coordinate values that are determined based at least partially on a set of CMM position coordinate values associated with the corresponding operative measurement synchronization trigger signal.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for operating a coordinate measuring machine (CMM) including a CMM control system, a surface scanning probe that measures a workpiece surface by outputting probe workpiece measurements, and a probe measurement timing subsystem, the method comprising:

operating the CMM control system to output measurement synchronization trigger signals at predictable times;

operating the probe measurement timing subsystem to determine the predictable times;

operating the CMM to define a first probe workpiece measurement sample period that has a first sampling duration that is relatively shorter than a second sampling duration, and that provides a faster type of probe workpiece measurement that has a first level of accuracy;

operating the CMM to define a second probe workpiece measurement sample period that has a second sampling duration that is relatively longer than the first sampling duration, and that provides a slower type of probe workpiece measurement that has a second level of accuracy that is better than the first level of accuracy; and operating the CMM to perform of set of measurement operations including the first and second probe workpiece measurement sample periods, the set of measurement operations comprising:

a) initiating a current instance of the first probe workpiece measurement sample period at a first measurement lead time before a first measurement synchronization trigger signal and within a low-latency time window close to the first measurement synchronization trigger signal, wherein the first measurement synchronization trigger signal occurs at the next predictable time of the measurement synchronization trigger signals;

b) operating the CMM control system to output the first measurement synchronization trigger signal at the next predictable time and latch a first set of CMM position coordinate values associated with the first measurement synchronization trigger signal;

c) operating the surface scanning probe to output a current instance of the faster type of probe workpiece measurement associated with the current instance of a first probe workpiece measurement sample period, at a first output time that is associated with the first measurement synchronization trigger signal and that ends within the low-latency time window close to the first measurement synchronization trigger signal;

d) initiating a current instance of the second probe workpiece measurement sample period at a second measurement time that is defined relative to its corresponding operative measurement synchronization trigger signal, wherein the corresponding operative measurement synchronization trigger signal is one of the first measurement synchronization trigger signal or a second measurement synchronization trigger signal that occurs subsequent to the first measurement synchronization trigger signal, e) operating the surface scanning probe to output a current instance of the slower type of probe workpiece measurement associated with the current instance of the second probe workpiece measurement sample period, at a second output time that is associated with the corresponding operative measurement synchronization trigger signal; and f) operating the CMM control system to associate the current instance of the slower type of probe workpiece measurement with a properly combinable set of CMM position coordinate values that are determined based at least partially on a set of CMM position coordinate values associated with the corresponding operative measurement synchronization trigger signal.

2. The method of claim 1, wherein the faster and slower types of probe workpiece measurements output by the surface scanning probe characterize a deflection of a stylus of the surface scanning probe relative to a base of the surface scanning probe.

3. The method of claim 2, wherein the method further comprises:

g) operating the CMM control system to combine the current instance of the slower type of probe workpiece measurement with the properly combinable set of CMM position coordinate values to determine a corresponding high accuracy workpiece surface location measurement.

4. The method of claim 1, wherein:
the first probe workpiece measurement sample period has a duration comprising a first sample set including at least one individual measurement sample;
the first output time comprises an digital data transfer time during which the surface scanning probe transfers the current instance of the slower type of probe workpiece measurement to the CMM controller; and
the method further comprises operating the probe measurement timing subsystem to determine the first measurement lead time such that it is long enough to complete the first probe workpiece measurement sample period and subsequently complete the digital data transfer time and end the first output time within the low-latency time window close to the first measurement synchronization trigger signal.

5. The method of claim 4, wherein the method comprises operating the probe measurement timing subsystem to determine the first measurement lead time such that it is at least as long as the sum of the first probe workpiece measurement sample period and the digital data transfer time, and the end of the first output time occurs prior to the first measurement synchronization trigger signal.

6. The method of claim 4, wherein:
in step d) the corresponding operative measurement synchronization trigger signal is the first measurement synchronization trigger signal;
in step e) the surface scanning probe is operated to output a current instance of the slower type of probe workpiece measurement associated with the current instance of the second probe workpiece measurement sample period at a second output time that is associated with the first measurement synchronization trigger signal, wherein the second output time occurs after the first output time; and
in step f) the CMM control system is operated to associate the current instance of the slower type of probe workpiece measurement with a properly combinable set of CMM position coordinate values that are determined based at least partially on the first set of CMM position coordinate values associated with the first measurement synchronization trigger signal.

7. The method of claim 6, wherein:
the second probe workpiece measurement sample period has a duration comprising a second sample set comprising more individual measurement samples than the first sample set, and has an effective sample time approximately in the middle of the second sample set of individual measurement samples; and
in step f) the properly combinable set of CMM position coordinate values are determined corresponding to a time that is approximately the same as the effective sample time of the current instance of the second probe workpiece measurement sample period.

8. The method of claim 7, wherein:
the method further comprises operating the probe measurement timing subsystem to determine the second measurement time such that it occurs after the first measurement lead time, and after the first output time, and after the first measurement synchronization trigger signal; and
in step f) the properly combinable set of CMM position coordinate values are a set of CMM position coordinate values extrapolated beyond the first set of CMM position coordinate values based on a time difference between first measurement synchronization trigger signal and the effective sample time of the current instance of the second probe workpiece measurement sample period and a characterization of the rate of change of the CMM position coordinate values over a time period before the first measurement synchronization trigger signal.

9. The method of claim 7, wherein:
the first probe workpiece measurement sample period is shorter than and included within the duration of the second probe workpiece measurement sample period, and the first sample set comprises at least one individual measurement sample that is shared with the second sample set and that occurs within the low-latency time window close to the first measurement synchronization trigger signal;
the method further comprises operating the probe measurement timing subsystem to determine the second measurement time such that it occurs at a second lead time before the first measurement synchronization trigger signal and before the first measurement lead time, wherein the second lead time is determined such that the effective sample time of the current instance of the second probe workpiece measurement sample period approximately coincides with the first measurement synchronization trigger signal; and in step f) the properly combinable set of CMM position coordinate values is the first set of CMM position coordinate values associated with the first measurement synchronization trigger signal.

10. The method of claim 4, wherein:

in step d) the corresponding operative measurement synchronization trigger signal is a second measurement synchronization trigger signal that occurs subsequent to the first measurement synchronization trigger signal and the current instance of the second probe workpiece measurement sample period initiated at a second measurement time that is defined relative to the second measurement synchronization trigger signal;

the method further comprises operating the CMM control system to output the second measurement synchronization trigger signal and latch a second set of CMM position coordinate values associated with the second measurement synchronization trigger signal;

in step e) the surface scanning probe is operated to output a current instance of the slower type of probe workpiece measurement associated with the current instance of the second probe workpiece measurement sample period, at a second output time that is associated with the second measurement synchronization trigger signal, wherein the second output time occurs after the second measurement synchronization trigger signal; and in step f) the CMM control system is operated to associate the current instance of the slower type of probe workpiece measurement with a properly combinable set of CMM position coordinate values that are determined based at least partially on the second set of CMM position coordinate values associated with the second measurement synchronization trigger signal.

11. The method of claim 10, wherein:

the method further comprises operating the probe measurement timing subsystem to determine at least one of the second measurement synchronization trigger signal and the second measurement time such that the second measurement time occurs at a second lead time before the second measurement synchronization trigger signal, wherein the second lead time is determined such that the effective sample time of the current instance of the second probe workpiece measurement sample period approximately coincides with the second measurement synchronization trigger signal; and in step f) the properly combinable set of CMM position coordinate values is the second set of CMM position coordinate values associated with the second measurement synchronization trigger signal.

12. The method of claim 1, wherein the CMM is operated to repeatedly perform the set of measurement operations including the first and second probe workpiece measurement sample periods at a constant repetition rate over a period of time, the set of measurement operations comprising steps a) through f).

13. The method of claim 1, wherein:

the method further comprises operating the probe measurement timing subsystem to determine the timing of first probe sample period trigger signals usable to initiate the first probe workpiece measurement sample period at the first measurement lead time before a first measurement synchronization trigger signal and within a low-latency time window close to the first measurement synchronization trigger signal, wherein each first probe sample period trigger signal has a first probe sample period trigger width or duration;

the method further comprises operating the probe measurement timing subsystem to determine the timing of second probe sample period trigger signals usable to initiate the second probe workpiece measurement sample period at the second measurement time that is defined relative to its corresponding operative measurement synchronization trigger signal, wherein each second probe sample period trigger signal has a second trigger width or duration that is different than the first trigger width or duration;

in step a) the current instance of the first probe workpiece measurement sample period is initiated in the surface scanning probe in response to receiving a measurement trigger signal from the probe measurement timing subsystem that has the first trigger width or duration, which identifies it as a first probe sample period trigger signal; and in step d) the current instance of the second probe workpiece measurement sample period is initiated in the surface scanning probe in response to receiving a measurement trigger signal from the probe measurement timing subsystem that has the second trigger width or duration, which identifies it as a second probe sample period trigger signal.

14. The method of claim 1, wherein the probe measurement timing subsystem is located in the surface scanning probe.

15. The method of claim 1, wherein the probe measurement timing subsystem is located in the CMM control system.

16. The method of claim 15, wherein the probe measurement timing subsystem is located in an interchangeable card in the CMM control system, and the interchangeable card is specifically associated with at least one of an individual surface scanning probe, or a model or type of the surface scanning probe.

17. The method of claim 1, wherein:

the CMM control system operates to output repeated measurement synchronization trigger signals with a constant trigger period $t_{sync}$ between the repeated measurement synchronization trigger signals; and operating the probe measurement timing subsystem to determine the predictable times comprises inputting the repeated measurement synchronization trigger signals to the probe measurement timing subsystem with the constant trigger period $t_{sync}$, and determining a predictable timing of the repeated measurement synchronization trigger signals based on the constant trigger period $t_{sync}$.

18. A method for operating a coordinate measuring machine (CMM) including a CMM control system, a surface scanning probe that measures a workpiece surface by outputting probe workpiece measurements, and a probe measurement timing subsystem, the method comprising:

operating the CMM control system to output measurement synchronization trigger signals at predictable times;

operating the probe measurement timing subsystem to determine the predictable times;

operating the CMM to define a first probe workpiece measurement sample period that has a first sampling duration that is relatively shorter than a second sampling duration and that provides a faster type of probe workpiece measurement that has a first level of accuracy;

operating the CMM to define a second probe workpiece measurement sample period that has a second sampling duration that is relatively longer than the first sampling duration and that provides a slower type of probe workpiece measurement that has a second level of accuracy that is better than the first level of accuracy; and operating the CMM to perform of set of measurement operations including the first and second probe workpiece measurement sample periods, the set of measurement operations comprising:

initiating a current instance of the first probe workpiece measurement sample period at a first measurement lead time before a first measurement synchronization trigger signal and within a low-latency time window close to the first measurement synchronization trigger signal, wherein the first measurement synchronization trigger signal occurs at the next predictable time of the measurement synchronization trigger signals;

operating the CMM control system to output the first measurement synchronization trigger signal at the next predictable time and latch a first set of CMM position coordinate values associated with the first measurement synchronization trigger signal;

operating the surface scanning probe to output a current instance of the faster type of probe workpiece measurement associated with the current instance of a first probe workpiece measurement sample period, at a first output time that is associated with the first measurement synchronization trigger signal and that ends within the low-latency time window close to the first measurement synchronization trigger signal;

initiating a current instance of the second probe workpiece measurement sample period at a second measurement time that is different than the first measurement lead time and that is defined relative to the first measurement synchronization trigger signal, operating the surface scanning probe to output a current instance of the slower type of probe workpiece measurement associated with the current instance of the second probe workpiece measurement sample period, at a second output time that is associated with the first measurement synchronization trigger signal, wherein the second output time occurs after the first output time; and operating the CMM control system to associate the current instance of the slower type of probe workpiece measurement with a properly combinable set of CMM position coordinate values that are determined based at least partially on the first set of CMM position coordinate values associated with the first measurement synchronization trigger signal.

19. A method for operating a coordinate measuring machine (CMM) including a CMM control system, a surface scanning probe that measures a workpiece surface by outputting probe workpiece measurements, and a probe measurement timing subsystem, the method comprising:

operating the CMM control system to output measurement synchronization trigger signals at predictable times;

operating the probe measurement timing subsystem to determine the predictable times;

operating the CMM to define a first probe workpiece measurement sample period that has a first sampling duration that is relatively shorter than a second sampling duration, and that provides a faster type of probe workpiece measurement that has a first level of accuracy;

operating the CMM to define a second probe workpiece measurement sample period that has a second sampling duration that is relatively longer than the first sampling duration, and that provides a slower type of probe workpiece measurement that has a second level of accuracy that is better than the first level of accuracy; and operating the CMM to perform of set of measurement operations including the first and second probe workpiece measurement sample periods, the set of measurement operations comprising:

initiating a current instance of the first probe workpiece measurement sample period at a first measurement lead time before a first measurement synchronization trigger signal and within a low-latency time window close to the first measurement synchronization trigger signal, wherein the first measurement synchronization trigger signal occurs at the next predictable time of the measurement synchronization trigger signals;

operating the CMM control system to output the first measurement synchronization trigger signal at the next predictable time and latch a first set of CMM position coordinate values associated with the first measurement synchronization trigger signal;

operating the surface scanning probe to output a current instance of the faster type of probe workpiece measurement associated with the current instance of a first probe workpiece measurement sample period, at a first output time that is associated with the first measurement synchronization trigger signal and that ends within the low-latency time window close to the first measurement synchronization trigger signal;

initiating a current instance of the second probe workpiece measurement sample period at a second measurement time that is defined relative its corresponding operative measurement synchronization trigger signal, wherein the corresponding operative measurement synchronization trigger signal is a second measurement synchronization trigger signal that occurs subsequent to the first measurement synchronization trigger signal, operating the CMM control system to output the second measurement synchronization trigger signal and latch a second set of CMM position coordinate values associated with the second measurement synchronization trigger signal;

operating the surface scanning probe to output a current instance of the slower type of probe workpiece measurement associated with the current instance of the second probe workpiece measurement sample period, at a second output time that is associated with the second measurement synchronization trigger signal; and operating the CMM control system to associate the current instance of the slower type of probe workpiece measurement with a properly combinable set of CMM position coordinate values that are determined based at least partially on the second set of CMM position coordinate values associated with the second measurement synchronization trigger signal.

* * * * *